US009010527B2

(12) United States Patent
Ishii et al.

(10) Patent No.: US 9,010,527 B2
(45) Date of Patent: Apr. 21, 2015

(54) DRIVE SWITCHING MECHANISM, ROTARY DRIVING DEVICE INCLUDING THE SAME, AND DRIVE PROCESSING DEVICE

(71) Applicant: Fuji Xerox Co., Ltd.

(72) Inventors: Satoru Ishii, Kanagawa (JP); Masaya Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/141,050

(22) Filed: Dec. 26, 2013

(65) Prior Publication Data

US 2014/0305772 A1  Oct. 16, 2014

(30) Foreign Application Priority Data

Apr. 12, 2013  (JP) ................. 2013-083993

(51) Int. Cl.
  *B65G 23/00*  (2006.01)
  *B65G 13/06*  (2006.01)
  *B65H 29/58*  (2006.01)
(52) U.S. Cl.
  CPC ............... *B65G 13/06* (2013.01); *B65H 29/58* (2013.01)
(58) Field of Classification Search
  CPC ........ B65G 13/06; B65H 29/58; B65H 29/20; B65H 29/60; B65H 3/06; B65H 5/06; G03G 15/00; F16H 3/34; F16H 37/06; F16H 1/20; H04N 1/00
  USPC ............... 198/369.1, 369.2, 367, 832, 832.1; 271/3.14, 3.19, 314; 358/414; 399/10, 399/24, 83; 74/353, 354, 404
  See application file for complete search history.

(56) References Cited

U.S. PATENT DOCUMENTS

| 3,766,701 | A | * | 10/1973 | Besserdich et al. ............. 53/447 |
| 3,842,962 | A | * | 10/1974 | Grachev et al. ............... 198/367 |
| 4,353,543 | A | * | 10/1982 | Ikeda et al. .................... 271/306 |
| 4,354,671 | A | * | 10/1982 | Bergland ................... 270/58.01 |
| 5,845,110 | A | * | 12/1998 | Lee .................................... 399/2 |
| 2002/0162411 | A1 | * | 11/2002 | Faucher et al. ................. 74/414 |
| 2004/0217542 | A1 | * | 11/2004 | Aguirre Camacho ........ 271/186 |
| 2013/0149008 | A1 | * | 6/2013 | Oomoto et al. ............... 399/167 |

FOREIGN PATENT DOCUMENTS

| JP | 10-90966 A | 4/1998 |
| JP | 2002-120948 A | 4/2002 |
| JP | 2007-290853 A | 11/2007 |

* cited by examiner

*Primary Examiner* — James R Bidwell
(74) *Attorney, Agent, or Firm* — Sughrue Mion, PLLC

(57) ABSTRACT

A drive switching mechanism includes first to third transmission element trains, a connection/disconnection element disposed at one of a position between the first and second transmission element trains and a position in the third transmission element train, and a rotation restraining element disposed at the other of the positions. When a drive transmission path is disconnected by the connection/disconnection element, the rotation restraining element is drivenly rotated on the basis of a driving force transmitted from the first transmission element train and selects a drive transmission path that is different from the drive transmission path disconnected by the connection/disconnection element. When the drive transmission path is connected by the connection/disconnection element, the rotation restraining element stops being drivenly rotated on the basis of driving forces transmitted from the first and second transmission element trains and selects the drive transmission path connected by the connection/disconnection element.

8 Claims, 19 Drawing Sheets

| OPERATING STATE OF OUTPUT ROLLER | ELECTROMAGNETIC CLUTCH FOR NORMAL SPEED | ELECTROMAGNETIC CLUTCH FOR HIGH SPEED | TORQUE LIMITER |
|---|---|---|---|
| NORMAL ROTATION | OFF | OFF | DRIVEN ROTATION |
| NORMAL-SPEED REVERSE ROTATION | ON | OFF | FREE ROTATION |
| HIGH-SPEED REVERSE ROTATION | OFF | ON | FREE ROTATION |

DRIVE SWITCHING MECHANISM, ROTARY DRIVING DEVICE INCLUDING THE SAME, AND DRIVE PROCESSING DEVICE

CROSS-REFERENCE TO RELATED APPLICATIONS

This application is based on and claims priority under 35 USC 119 from Japanese Patent Application No. 2013-083993 filed Apr. 12, 2013.

BACKGROUND

Technical Field

The present invention relates to a drive switching mechanism, a rotary driving device including the drive switching mechanism, and a drive processing device.

SUMMARY

According to an aspect of the invention, a drive switching mechanism includes a first transmission element train that transmits a driving force from a drive source that rotates in a predetermined direction; a second transmission element train that is connectable to the first transmission element train and that transmits the driving force to a rotatable body; a third transmission element train disposed in an indirect path connecting an element of the first transmission element train to an element of the second transmission element train; a connection/disconnection element disposed at one of a position between the first and second transmission element trains and a position in the third transmission element train, the connection/disconnection element connecting or disconnecting a drive transmission path depending on whether or not current is applied thereto; and a rotation restraining element disposed at the other of the position between the first and second transmission element trains and the position in the third transmission element train, the rotation restraining element being drivenly rotated, when the drive transmission path is disconnected by the connection/disconnection element, on the basis of a driving force transmitted from the first transmission element train and selecting a drive transmission path that is different from the drive transmission path disconnected by the connection/disconnection element, and the rotation restraining element stopping being drivenly rotated, when the drive transmission path is connected by the connection/disconnection element, on the basis of driving forces transmitted from the first and second transmission element trains and selecting the drive transmission path connected by the connection/disconnection element.

BRIEF DESCRIPTION OF THE DRAWINGS

Exemplary embodiments of the present invention will be described in detail based on the following figures, wherein:

FIG. 10 illustrates the rotary driving device according to the first exemplary embodiment in an operating state in which the electromagnetic clutch is ON;

FIG. 14 illustrates the rotary driving device according to the first comparative example in an operating state in which a first electromagnetic clutch is OFF and a second magnetic clutch is ON;

DETAILED DESCRIPTION

Overview of Exemplary Embodiment

Figure 1:
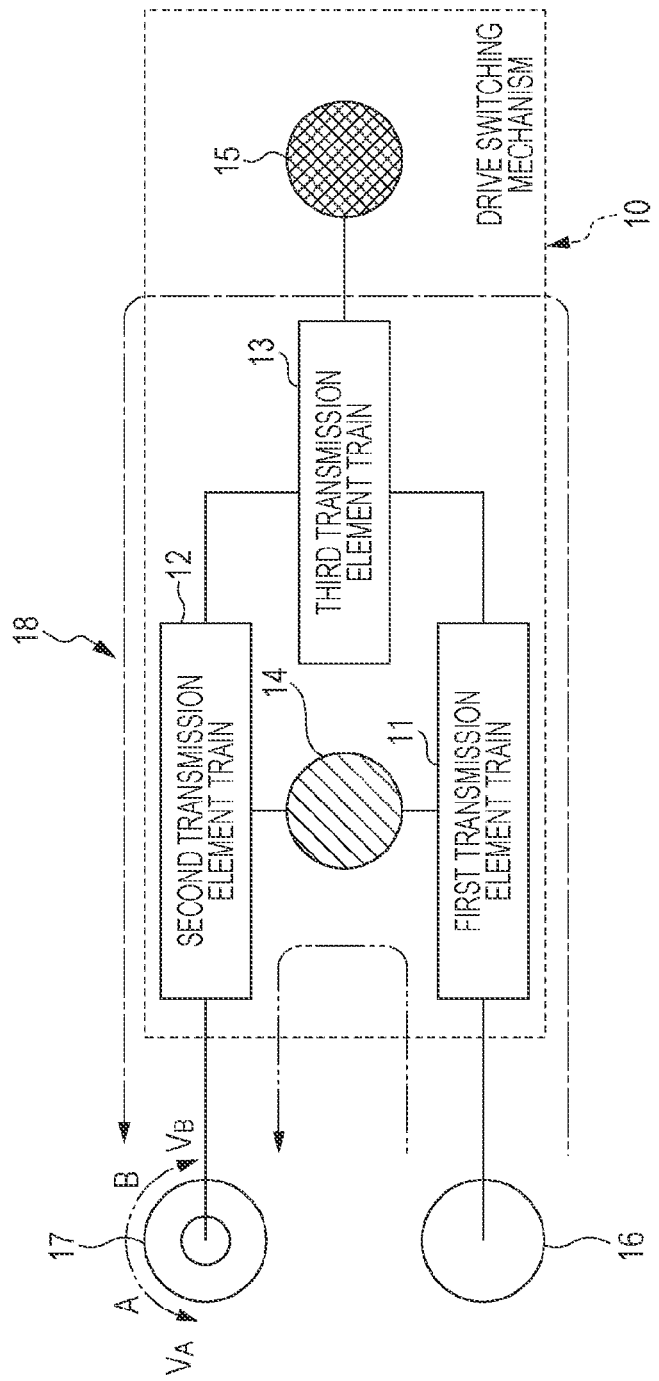
FIG. 1 is a schematic diagram illustrating a rotary driving device including a drive switching mechanism according to an exemplary embodiment of the present invention and a drive processing device including the rotary driving device.

FIG. 1 is a schematic diagram illustrating a drive processing device according to an exemplary embodiment of the present invention.

Referring to FIG. 1, the drive processing device includes a rotatable body 17 and a rotary driving device 18. The rotary driving device 18 rotates the rotatable body 17 so that the rotational state of the rotatable body 17 is switchable.

The drive processing device according to the present exemplary embodiment may be any device that includes the rotatable body 17, the rotary driving device 18, and a predetermined processor.

For example, the drive processing device may be an image forming apparatus including an image forming unit that forms an image on a recording medium, a recording medium transport unit that transports the recording medium to the image forming unit, and a recording medium container that contains the recording medium on which the image has been formed. In this case, the recording medium transport unit may use the rotary driving device 18 when driving a transport member (corresponding to the rotatable body 17) that switches a transport state in which the recording medium.

The rotary driving device 18 includes a drive source 16 and a drive switching mechanism 10. The drive source 16 rotates in a predetermined direction. The drive switching mechanism 10 transmits a driving force from the drive source 16 to the rotatable body 17 so that the rotational state of the rotatable body is switchable.

In the present exemplary embodiment, the drive switching mechanism 10 includes a first transmission element train 11, a second transmission element train 12, a third transmission element train 13, a connection/disconnection element 14, and a rotation restraining element 15. The first transmission element train 11 transmits a driving force from the drive source 16 that rotates in a predetermined direction. The second transmission element train 12 is connectable to the first transmission element train 11 and transmits the driving force to the rotatable body 17. The third transmission element train 13 is disposed in an indirect path connecting an element of the first transmission element train 11 to an element of the second transmission element train 12. The connection/disconnection element 14 is disposed between the first and second transmission element trains 11 and 12 and connects or disconnects a drive transmission path depending on whether or not current is applied thereto. The rotation restraining element 15 is disposed in a part of the third transmission element train 13. When the drive transmission path is disconnected by the connection/disconnection element 14, the rotation restraining element 15 performs passive rotation on the basis of a driving force transmitted from the first transmission element train 11 and selects a drive transmission path that is different from the drive transmission path disconnected by the connection/disconnection element 14. When the drive transmission path is connected by the connection/disconnection element 14, the rotation restraining element 15 stops passive rotation on the basis of driving forces transmitted from the first transmission element train 11 and the second transmission element train 12 and selects the drive transmission path connected by the connection/disconnection element 14.

With such a structure, the drive switching mechanism 10 switches between two drive transmission paths for transmitting a driving force from the drive source 16 by using the connection/disconnection element 14 and the rotation restraining element 15.

The rotational state of the rotatable body 17 may be switched between rotation in a normal direction and rotation in a reverse direction, between two rotation speeds in the same direction, or between any combinations of different rotation directions and different rotation speeds.

The drive source 16 may be any appropriate drive source that rotates in a predetermined direction. For example, the drive source 16 may be a drive source that is rotatable in normal and reverse directions and that rotates in a predetermined one of these directions.

Each of the first to third transmission element trains 11 to 13 includes one or more drive transmission elements, which are typically one or more rows of gears that mesh with each other. Alternatively, the drive transmission elements may be other drive transmission elements, such as pulleys and belts.

As shown by an alternate long and short dash line in FIG. 1, the first transmission element train 11 may be connected to the second transmission element train 12 along an indirect path in which the third transmission element train 13 is disposed. In this case, the drive transmission characteristics (the rotation ratios, the rotation directions, and the number) of transmission elements may be selected in accordance with a rotational state (rotation direction A, rotation speed $v_A$) to be provided to the rotatable body 17. As shown by two-dot chain line in FIG. 1, the first and second transmission element trains 11 and 12 may be directly connected to each other. In this case, the drive transmission characteristics (the rotation ratios, the rotation directions, and the number) of transmission elements may be selected in accordance with a rotational state (rotation direction B, the rotation speed $v_B$), which is different from that to be provided to the rotatable body 17 when the first and second transmission element trains 11 and 12 are connected to each other along the indirect path.

The connection/disconnection element 14 may be any element that is configured to connect or disconnect a drive transmission path depending on whether or not current is applied thereto. A typical example the connection/disconnection element 14 may be an electromagnetic connection/disconnection device (electromagnetic clutch).

The rotation restraining element 15 may be an element that is disposed, for example, in a part of the third transmission element train 13 and that rotates freely when a torque generated when the drive transmission path is connected by the connection/disconnection element 14 is applied to the rotation restraining element 15. To be specific, the rotation restraining element 15 may be an element that rotates freely when torques generated on the basis of driving forces from both of the first and second transmission element trains 11 and 12 are applied thereto.

In FIG. 1, the connection/disconnection element 14 is disposed between the first and second transmission element trains 11 and 12, and the rotation restraining element 15 is disposed in a part of the third transmission element train 13. Alternatively, the rotation restraining element 15 may be disposed between the first and second transmission element trains 11 and 12, and the connection/disconnection element 14 may be disposed in a part of the third transmission element train 13.

The rotary driving device 18 and the drive switching mechanism 10 according to the present exemplary embodiment will be described below.

The rotation restraining element 15 may be a torque limiter that performs passive rotation when a torque smaller than a predetermined limit torque is applied thereto and that stops passive rotation and rotates freely when a torque larger than or equal to the predetermined limit torque is applied thereto.

As the torque limiter, any appropriate existing torque limiter may be used by appropriately setting a desired limit torque of the torque limiter by adjusting the urging force of an urging spring of the torque limiter. The rotary driving device 18 may be designed so that a torque smaller than a limit torque is applied to the torque limiter when the connection/disconnection element 14 is not connected and a torque larger than or equal to a limit torque is applied to the torque limiter when the connection/disconnection element 14 is connected.

The first to third transmission element trains 11 to 13 may rotate the rotatable body 17 in a predetermined normal direction A when the first and second transmission element trains 11 and 12 are directly connected to each other, and the first to third transmission element trains 11 to 13 may rotate the rotatable body 17 in a reverse direction B that is opposite to the normal direction A when the first to third transmission element trains 11 to 13 are connected along the indirect path.

In the present exemplary embodiment, when the third transmission element train 13 is included in a drive transmission path, the rotatable body 17 may be rotated in the reverse direction at a predetermined rotation speed.

Current may be applied to the connection/disconnection element 14 when the rotatable body 17 is in a rotational state in which a rotation time of the rotatable body 17 is short. By doing so, the life of the rotary driving device may be increased because the time for which current is applied to the connection/disconnection element is shorter than that of a case where current is applied when the rotatable body 17 is in a rotational state in which the rotation time of the rotatable body 17 is long.

Hereinafter, exemplary embodiments of the present invention will be described in detail with reference to the drawings.

First Exemplary Embodiment

Overall Structure of Image Forming Apparatus

Figure 2:
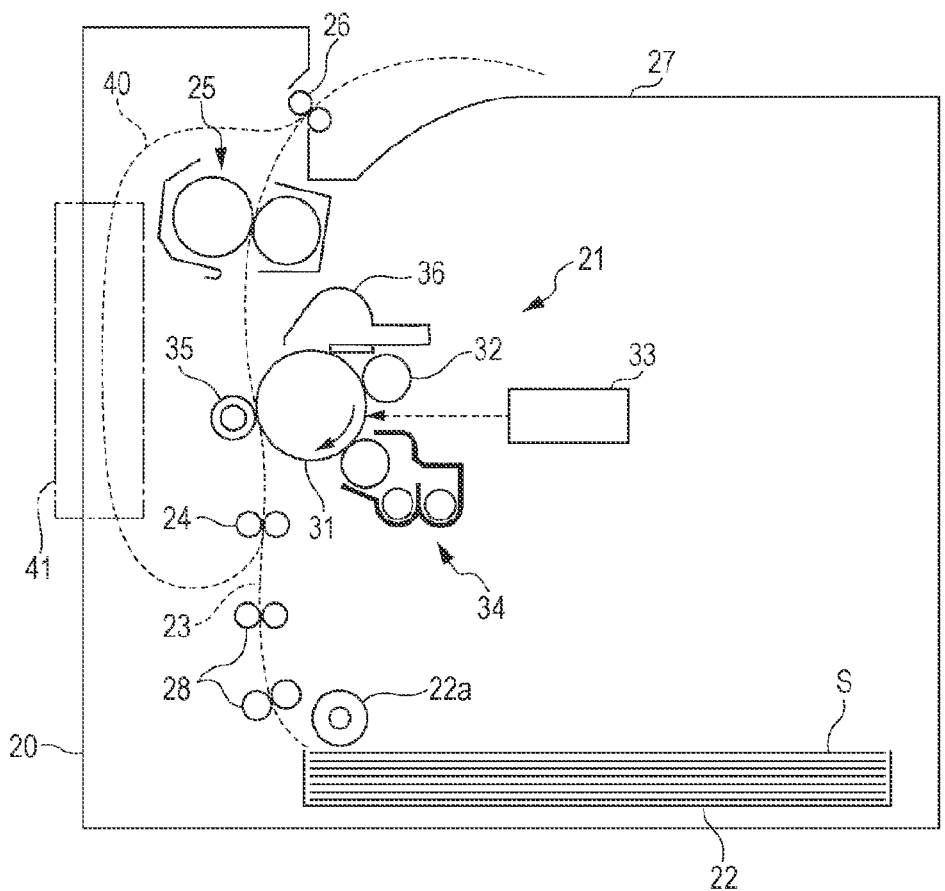
FIG. 2 illustrates the overall structure of an image forming apparatus according to a first exemplary embodiment, which is an example of a drive processing device.

FIG. 2 illustrates the overall structure of an image forming apparatus according to a first exemplary embodiment, which is an example of a drive processing device.

Referring to FIG. 2, the image forming apparatus includes an apparatus body 20, an image-forming engine 21 (image forming unit), a sheet supply container 22, a sheet output tray 27, and a sheet transport path 23. The image-forming engine 21 is, for example, an electrophotographic system disposed in the apparatus body 20. The sheet supply container 22, which is disposed below the image-forming engine 21 in the apparatus body 20, is capable of supplying a sheet S, which is an example of a recording medium. The sheet output tray 27, which is disposed at the top of the apparatus body 20, is capable of holding the sheet S on which an image has been recorded. The sheet transport path 23, which extends substantially vertically in a side portion of the apparatus body 20 (a left side portion in FIG. 2), guides the sheet S, which has been fed from the sheet supply container 22, to the image-forming engine 21 and to the sheet output tray 27.

In the present exemplary embodiment, the image-forming engine 21 includes a photoconductor 31, a charger 32, an exposure device 33, a developing device 34, a transfer device 35, and a cleaner 36. The photoconductor 31, which has a drum-like shape, is capable of carrying a toner image. The charger 32 is, for example, a charging roller that charges the photoconductor 31. The exposure device 33 is, for example, a laser scanner that forms an electrostatic latent image on the charged photoconductor 31. The developing device 34 develops the electrostatic latent image on the photoconductor 31 into a visual image by using a toner. The transfer device 35 is, for example, a transfer roller that transfers the toner image on the photoconductor 31 to the sheet S. The cleaner 36 removes foreign substances remaining on the photoconductor 31.

The sheet supply container 22 includes a pick-up roller 22a that feeds the sheets S one by one. A positioning roller 24, which is disposed upstream of the photoconductor 31 in the sheet transport path 23, temporarily positions the sheet S and then transports the sheet S. A fixing device 25 is disposed downstream of the photoconductor 31 along the sheet transport path 23. An output roller 26 is disposed immediately in front of the sheet output tray 27. As illustrated in FIG. 2, transport rollers 28 are appropriately arranged along the sheet transport path 23.

The image forming apparatus according to the present exemplary embodiment is capable of performing a duplex recording operation for forming images on both sides of the sheet S. In the present exemplary embodiment, a return transport path 40, which is independent from the sheet transport path 23, extends from the output roller 26 to a position on the upstream side of the positioning roller 24. A duplex transport module 41 disposed in the return transport path 40 returns the sheet S, on one side of which an image has been recorded, to the sheet transport path 23. A duplex recording operation is performed through the following process: the image-forming engine 21 forms an image on one side of the sheet S supplied from the sheet supply container 22; the sheet S is transported through the fixing device 25 to the output roller 26; the sheet S is transported to the return transport path 40 by rotating the output roller 26 in the reverse direction; the duplex transport module 41 returns the sheet S to a position upstream of the positioning roller 24; the image-forming engine 21 forms an image on the other side of the sheet S; the sheet S is transported through the fixing device 25; and the output roller 26 outputs the sheet S, on which images have been formed on both sides thereof, to the sheet output tray 27.

Rotary Driving Device

Figure 3:
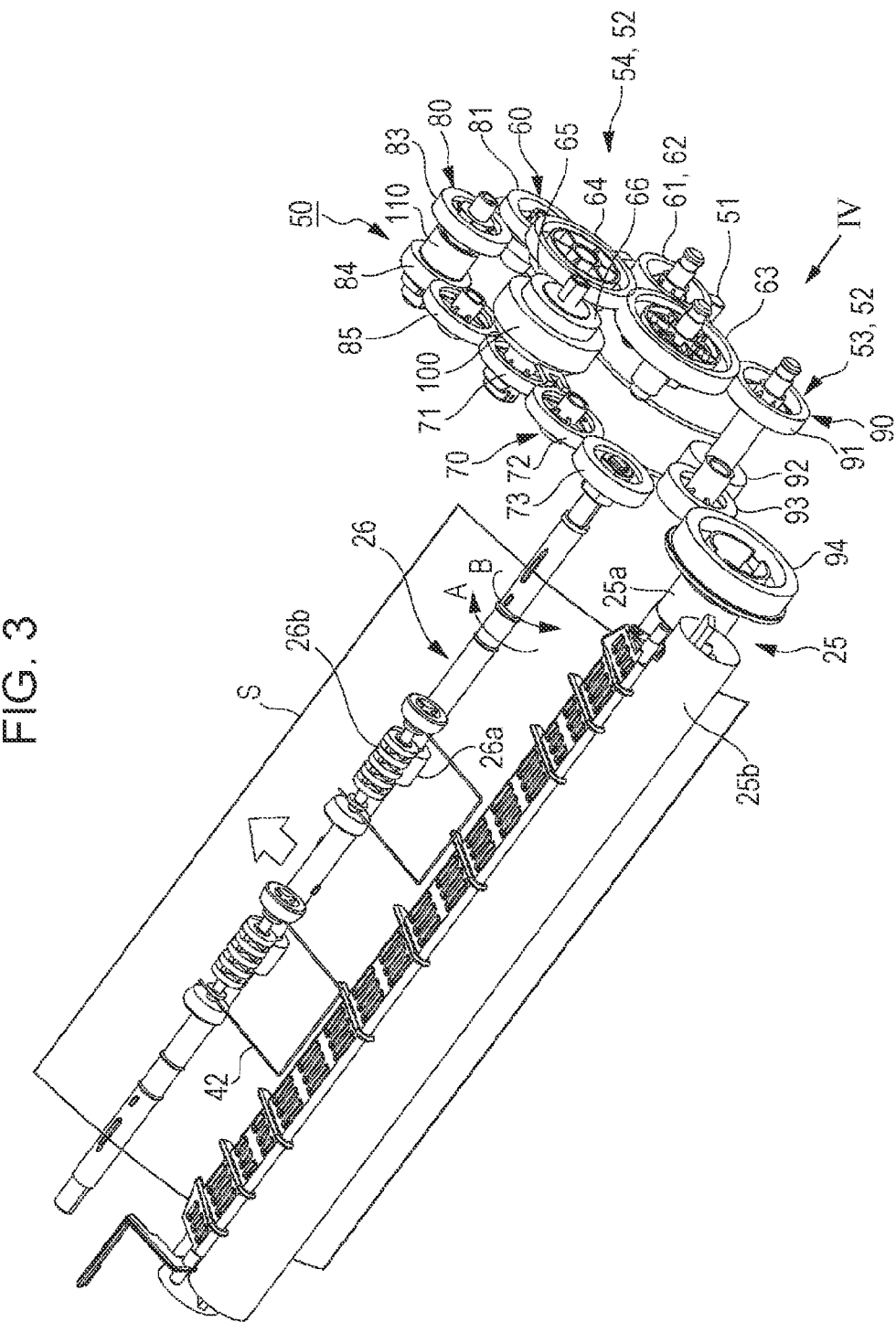
FIG. 3 illustrates a rotary driving device for driving an output roller and a fixing device of the image forming apparatus according to the first exemplary embodiment.
Figure 4:
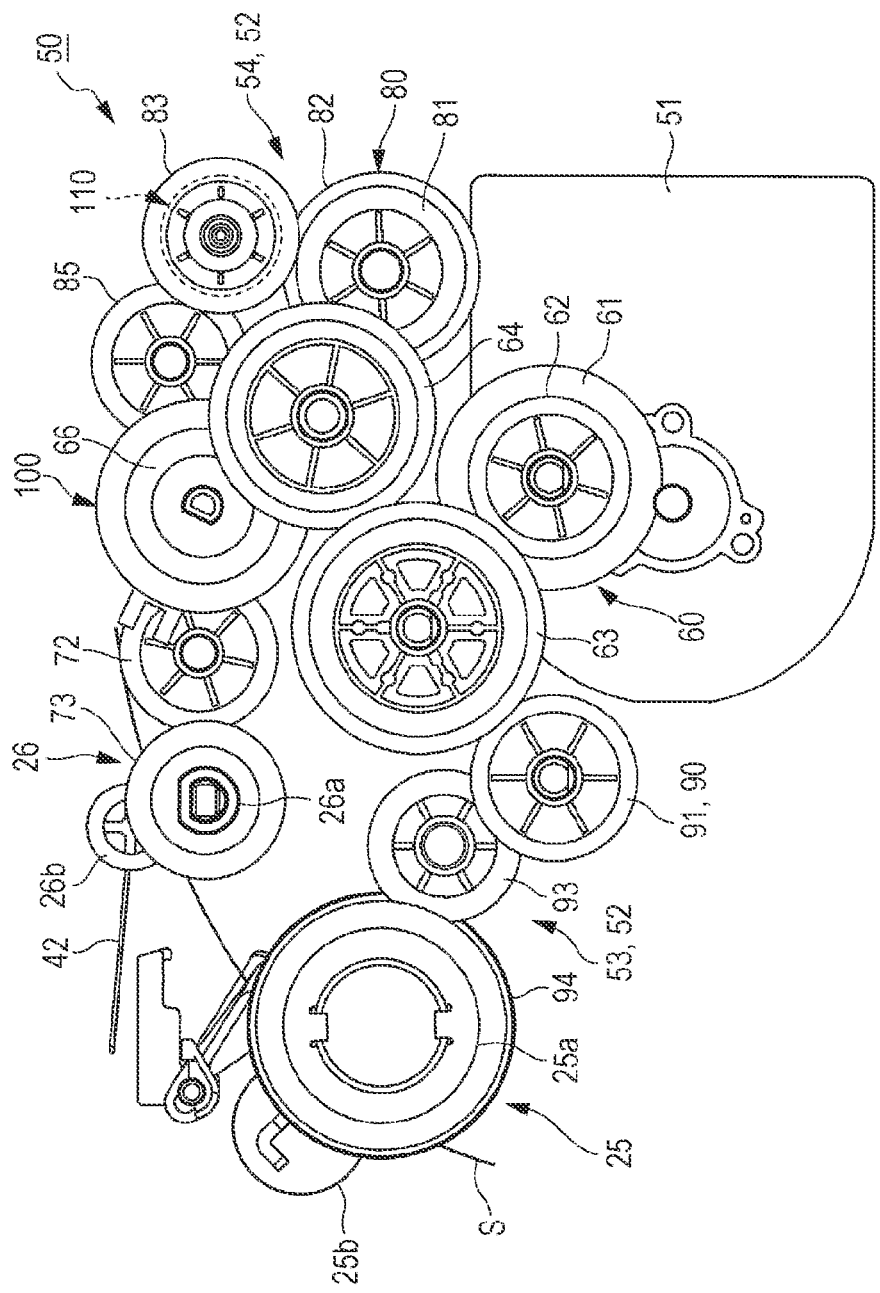
FIG. 4 illustrates the rotary driving device of FIG. 3 seen in the direction of arrow IV in FIG. 3.

The image forming apparatus according to the present exemplary embodiment includes a rotary driving device 50 illustrated in FIGS. 3 and 4, which drives the output roller 26 so that the rotational direction of the output roller 26 is switchable between a normal direction and a reverse direction. In the present exemplary embodiment, the rotary driving device 50 drives not only the output roller 26 but also the fixing device 25. Alternatively, the rotary driving device 50 may drive only the output roller 26. In this case, a rotary driving device for driving the fixing device 25 may be independently provided.

Here, the fixing device 25 and the output roller 26 included in the present exemplary embodiment will be described.

The fixing device 25 includes a heat fixing roller 25a and a pressure fixing roller 25b. The heat fixing roller 25a is driven by the rotary driving device 50 and contains, for example, a heater. The pressure fixing roller 25b is in pressed contact with the heat fixing roller 25a and is drivenly rotated by the heat fixing roller 25a.

The output roller 26 includes a drive output roller 26a and a driven output roller 26b. The drive output roller 26a is driven by the rotary driving device 50. The driven output roller 26b is in pressed contact with the drive output roller 26a and is drivenly rotated by the drive output roller 26a. Referring to FIGS. 3 and 4, guide plates 42 guide the sheet S toward a nip between the rollers 26a and 26b of the output roller 26.

In the present exemplary embodiment, the rotary driving device 50 includes a driving motor 51 and a drive switching mechanism 52. The driving motor 51, which is an example of a drive source, rotates in a predetermined direction. The drive switching mechanism 52 transmits a driving force from the driving motor 51 in a switchable manner. The rotary driving device 50 provides a predetermined driving force to the heat fixing roller 25a of the fixing device 25 and to the drive output roller 26a of the output roller 26a, which are objects to be driven.

In the present exemplary embodiment, the drive switching mechanism 52 includes a drive transmission system 53 for a fixing operation, which transmits a driving force to the fixing device 25; and a drive transmission system 54 for an output operation, which transmits a driving force to the output roller 26.

Drive Transmission System for Fixing Operation

As illustrated in FIGS. 3 and 4, the drive transmission system 53 for a fixing operation includes a first transmission gear train 60 and a fourth transmission gear train 90. The first transmission gear train 60 transmits a driving force from the driving motor 51. The fourth transmission gear train 90 meshes with an element (in the present exemplary embodiment, a third gear 63) of the first transmission gear train 60 and transmits a driving force to the heat fixing roller 25a.

In the present exemplary embodiment, the first transmission gear train 60 includes a first gear 61 that meshes with a gear portion of a shaft of the driving motor 51, a second gear 62 that is coaxial with the first gear 61, the third gear 63 that meshes with the peripheral surface of the second gear 62, a fourth gear 64 that meshes with the peripheral surface of the third gear 63, a fifth gear 65 that is coaxial with the fourth gear 64, and a sixth gear 66 that meshes with the peripheral surface of the fifth gear 65.

The fourth transmission gear train 90 includes a first gear 91 that meshes with the peripheral surface of an element (in the present exemplary embodiment, the third gear 63) of the first transmission gear train 60, a second gear 92 that is coaxial with the first gear 91, a third gear 93 that meshes with the peripheral surface of the second gear 92, and a fourth gear 94 that meshes with the peripheral surface of the third gear 93 and that is coaxial with the heat fixing roller 25a.

Drive Transmission System for Output Operation

Figure 5:
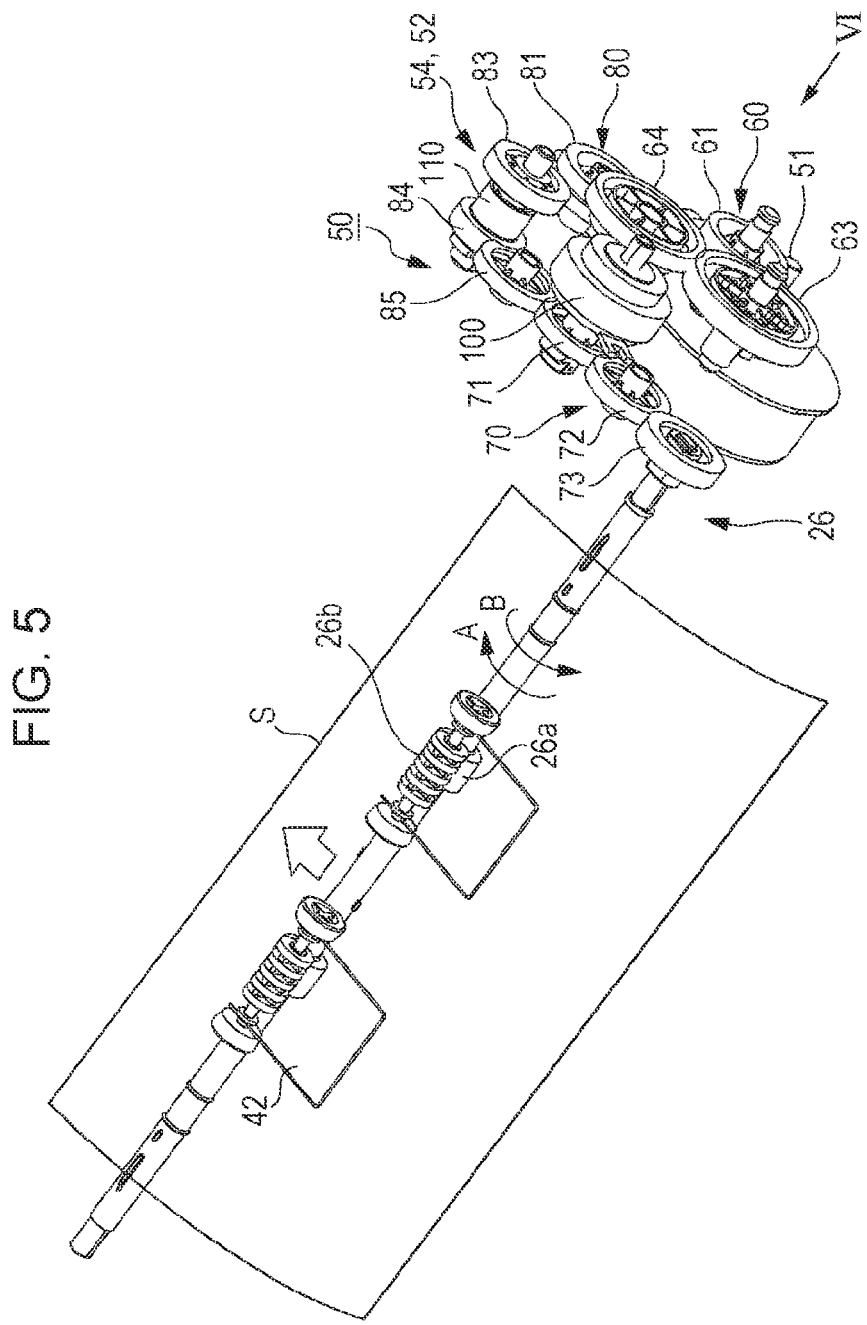
FIG. 5 illustrates the rotary driving device of FIG. 3 from which a drive system for the fixing device is removed.
Figure 6:
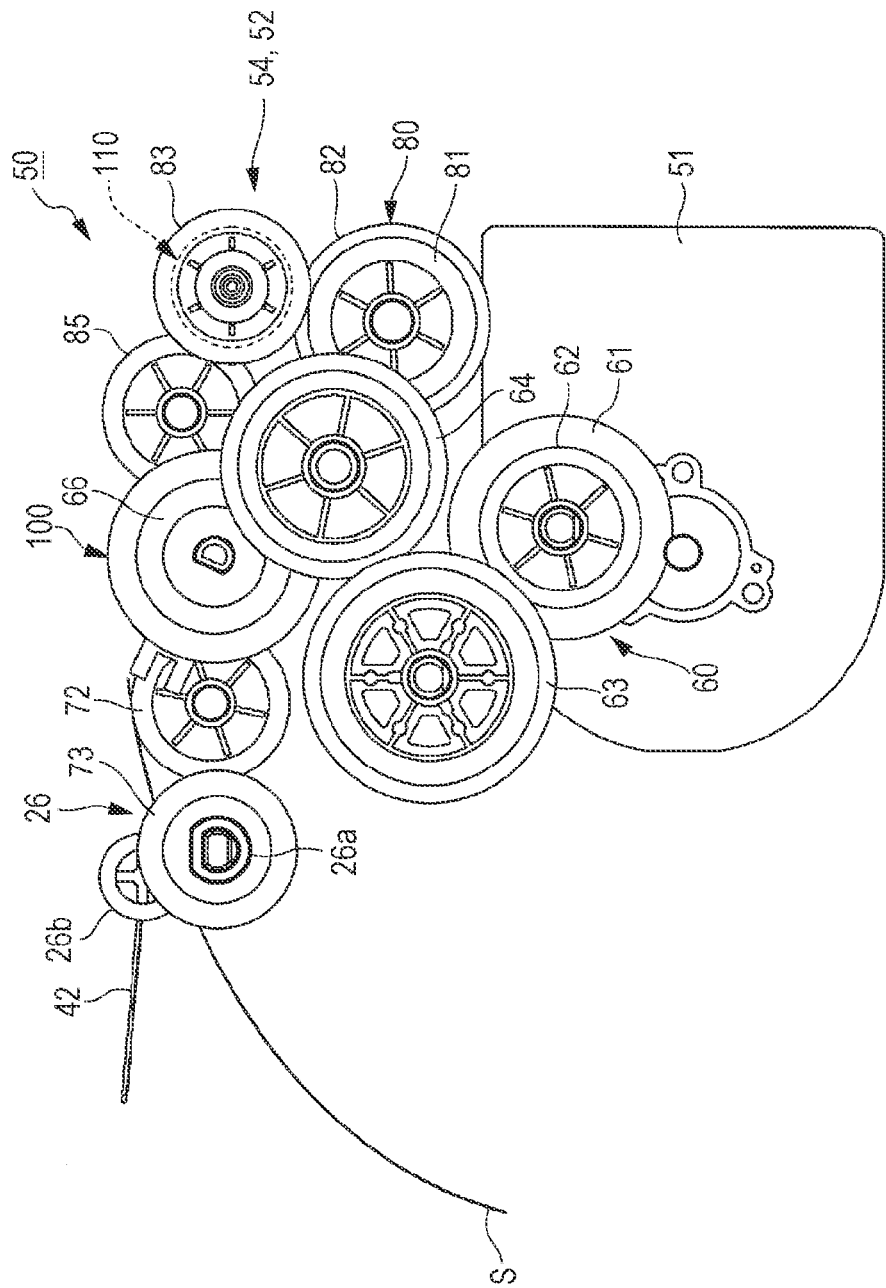
FIG. 6 illustrates the rotary driving device of FIG. 5 seen in the direction of arrow VI in FIG. 5.

As illustrated in FIGS. 5 and 6, the drive transmission system 54 for an output operation includes the first transmission gear train 60 described above, a second transmission gear train 70, a third transmission gear train 80, an electromagnetic clutch 100, and a torque limiter 110. The second transmission gear train 70 is connectable to the first transmission gear train 60 and is capable of transmitting a driving force to the drive output roller 26a of the output roller 26. The third transmission gear train 80 is disposed in an indirect path connecting the first transmission gear train 60 to the second transmission gear train 70. The electromagnetic clutch 100 is disposed between the first and second transmission gear trains 60 and 70. The torque limiter 110 is disposed in a part of the third transmission gear train 80.

First to Third Drive Transmission Gear Trains

As described above, the first transmission gear train 60 includes the first to sixth gears 61 to 66.

The second transmission gear train 70 includes a first gear 71, a second gear 72, and an output gear 73. The first gear 71 is coaxially connected to the sixth gear 66 of the first transmission gear train 60 through the electromagnetic clutch 100. The second gear 72 meshes with the peripheral surface of the first gear 71. The output gear 73 meshes with the peripheral surface of the second gear 72 and is coaxial with the drive output roller 26a.

The third transmission gear train 80 includes first to fifth gears 85. The first gear 81 meshes with the peripheral surface of the fifth gear 65 of the first transmission gear train 60. The second gear 82 is coaxial with the first gear 81. The third gear 83 meshes with the peripheral surface of the second gear 82. The fourth gear 84 is coaxial with the third gear 83. The fifth gear 85 meshes with the peripheral surface of the fourth gear 84 and the peripheral surface of the first gear 71 of the second transmission gear train 70.

Electromagnetic Clutch

Figure 7A:
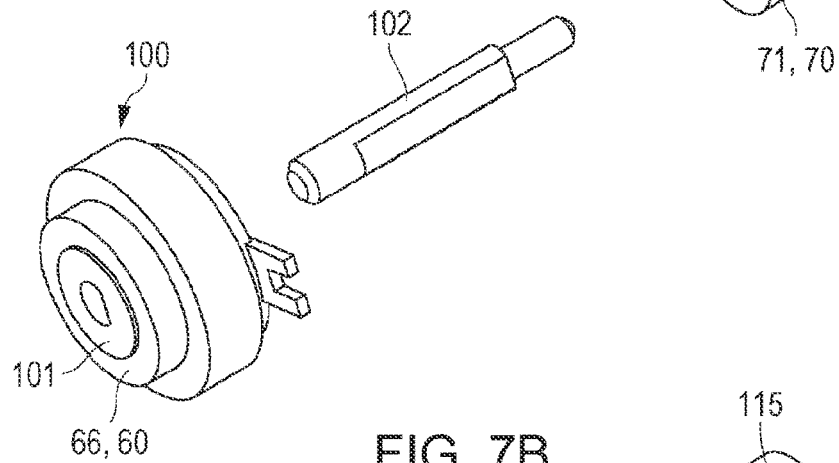
FIG. 7A is an exploded view of an electromagnetic clutch.

FIG. 7A illustrates the electromagnetic clutch 100, which includes a pair of clutch plates. When current is applied to the electromagnetic clutch 100, the pair of clutch plates are electromagnetically coupled to each other. When current is not applied, the pair of clutch plates are not coupled to each other. A rotor 101 is attached to one of the clutch plates, and the sixth gear 66 of the first transmission gear train 60 is fixed to the rotor 101 so as to be coaxial with the rotor 101. A shaft 102 is attached to the other clutch plate so as to be coaxial with the rotor 101. The first gear 71 of the second transmission gear train 70 is attached to the shaft 102.

When current is applied to the electromagnetic clutch 100 and the pair of clutch plates are electromagnetically coupled to each other, the rotor 101 and the shaft 102 are connected to each other, and therefore a driving force from the sixth gear 66 of the first transmission gear train 60 is transmitted through the rotor 101 and the shaft 102 to the first gear 71 of the second transmission gear train 70.

When current is not applied to the electromagnetic clutch 100 and the pair of clutch plates are not coupled to each other, the rotor 101 and the shaft 102 are not connected to each other and the rotor 101 rotates freely, and therefore a driving force from the sixth gear 66 of the first transmission gear train 60 is not transmitted to the first gear 71 of the second transmission gear train 70.

Torque Limiter

Figure 7B:
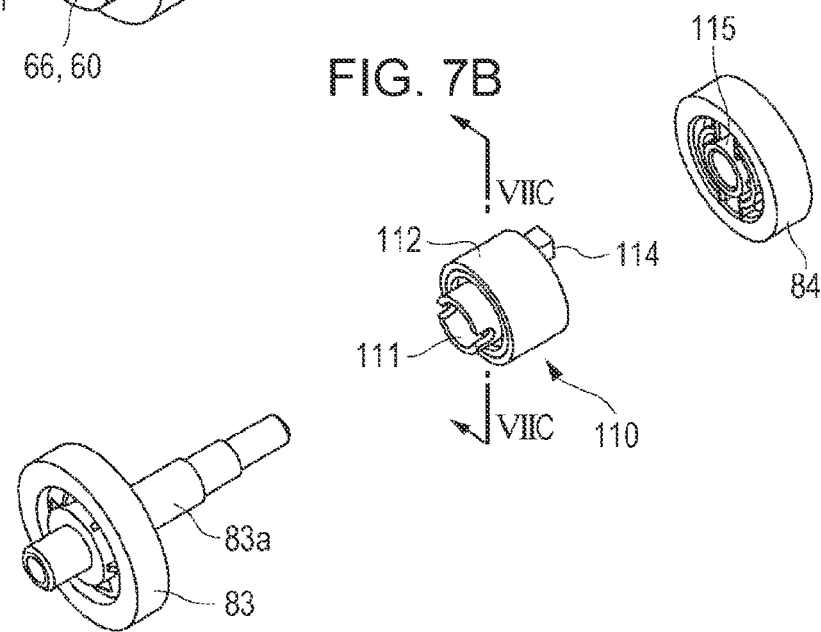
FIG. 7B is an exploded five of a torque limiter.
Figure 7C:
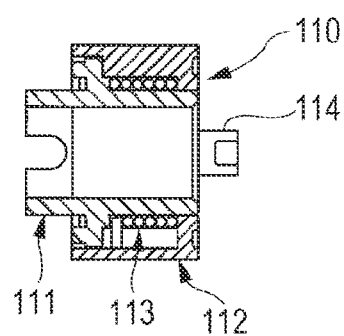
FIG. 7C is a sectional view taken along line VIIC-VIIC of FIG. 7B.

As illustrated in FIGS. 7B and 7C, the torque limiter 110 includes an inner wheel 111, an outer wheel 112, and a coil spring 113. A shaft 83a of the third gear 83 of the third transmission gear train 80 is fitted into the inner wheel 111 so as to be coaxial with the inner wheel 111. The outer wheel 112 covers the peripheral surface of the inner wheel 111. The coil spring 113 is pressed into a space between the inner wheel 111 and the outer wheel 112. The outer wheel 112 has a stopper protrusion 114, and the fourth gear 84 of the third transmission gear train 80 has a stopper recess 115, into which the stopper protrusion 114 is to be fitted. When the stopper protrusion 114 is fitted into the stopper recess 115, the fourth gear 84 is positioned relative to the outer wheel 112.

Figure 8:
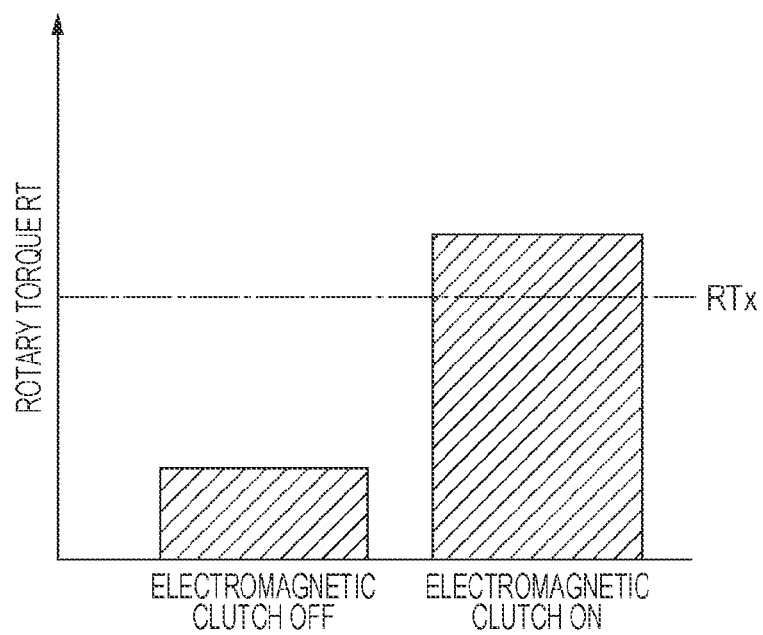
FIG. 8 is a graph representing the characteristics of the torque limiter.

FIG. 8 is a graph representing the torque characteristics of the torque limiter 110.

Referring to FIG. 8, when the rotary torque RT is less than a predetermined limit torque RTx, a rotational driving force applied to the inner wheel 111 is transmitted through the coil spring 113 to the outer wheel 112, and therefore the torque limiter 110 is drivenly rotated. Therefore, a driving force from the third gear 83 of the third transmission gear train 80 is transmitted through the torque limiter 110 to the fourth gear 84.

On the other hand, when the rotary torque RT is greater than or equal to the predetermined limit torque RTx, slipping between the inner wheel 111 or the outer wheel 112 and the coil spring 113 occurs, and the outer wheel 112 and the inner wheel 111 freely rotates relative to each other. Therefore, a rotational driving force applied to the inner wheel 111 is not transmitted to the outer wheel 112 through the coil spring 113 and is not transmitted to the fourth gear 84.

In the present exemplary embodiment, the limit torque RTx needs to be greater than the sum of a rotary torque when the electromagnetic clutch 100 is freely rotating (when current is not applied) and an additional rotary torque to be provided in consideration of wear of the output roller 26. Moreover, the limit torque RTx needs to be smaller than the sum of a rated torque when current is applied to the electromagnetic clutch 100 and a correction amount needed as a margin.

Next, a drive switching operation performed by the rotary driving device according to the present exemplary embodiment will be described.

When Electromagnetic Clutch is OFF

In order to rotate the output roller 26 in a direction (normal direction) in which the sheet S is output, a controller (not shown) causes current to the electromagnetic clutch 100 to be turned off.

Figure 9:
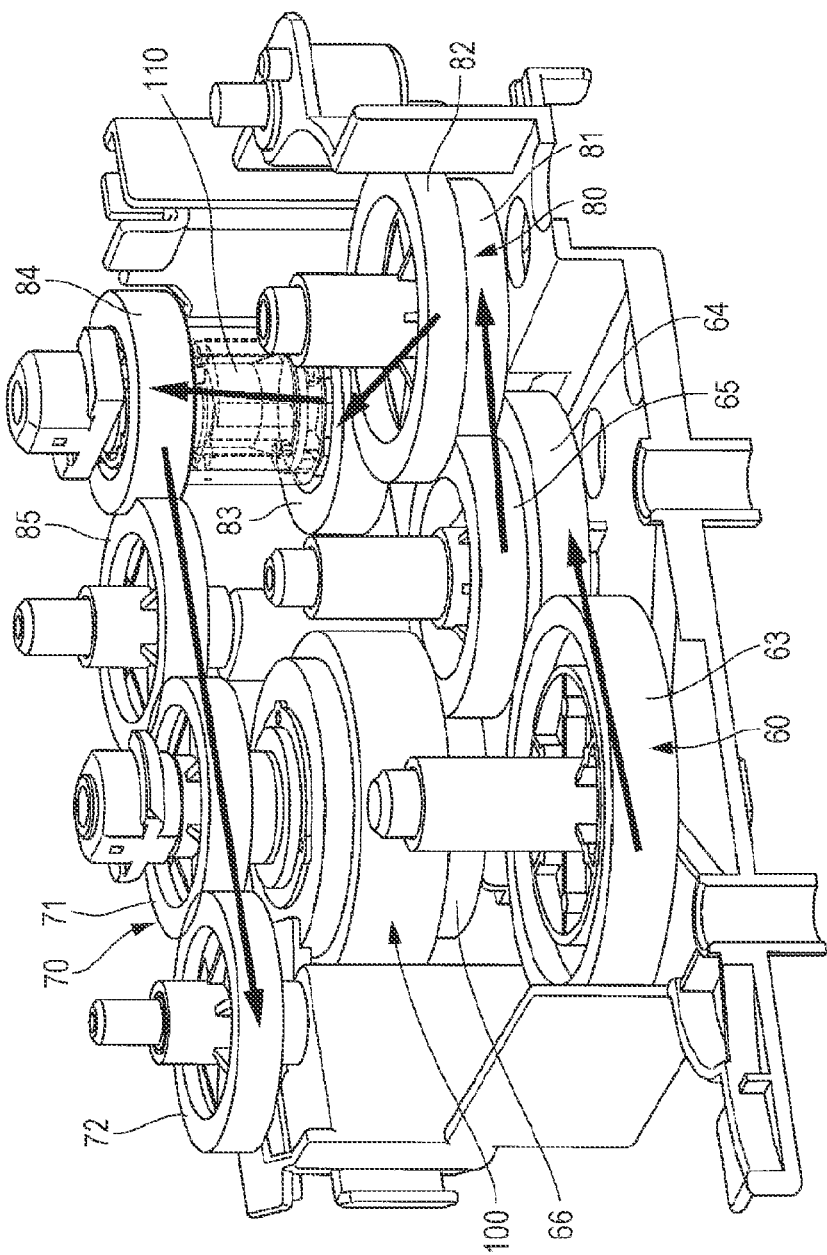
FIG. 9 illustrates the rotary driving device according to the first exemplary embodiment in an operating state in which the electromagnetic clutch is OFF.
Figure 11A:
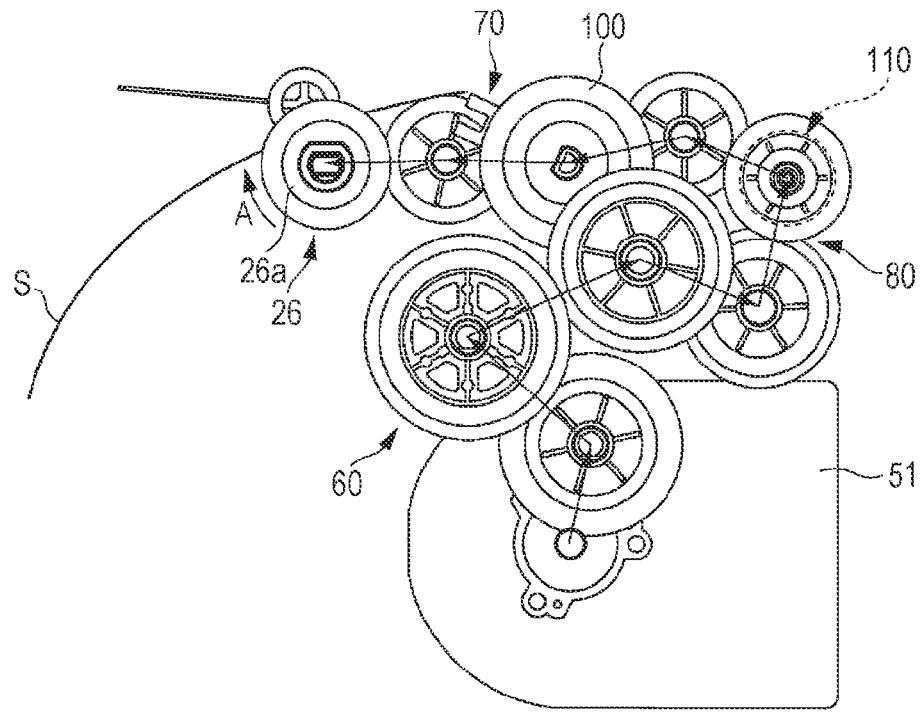
FIG. 11A is a schematic view illustrating a drive transmission path of the rotary driving device according to the first exemplary embodiment in FIG. 9.

In this state, as illustrated in FIGS. 9 and 11A, because current to the electromagnetic clutch 100 is turned off, a drive transmission path through the electromagnetic clutch 100 is disconnected. Thus, even if a driving force from the sixth gear 66 of the first transmission gear train 60 is applied to the electromagnetic clutch 100, the driving force is not transmitted through the electromagnetic clutch 100, because the electromagnetic clutch 100 is in a freely rotatable state.

Therefore, in the present exemplary embodiment, a driving force from the driving motor 51 is transmitted to the third transmission gear train 80 through the first to fifth gears 61 to 65 of the first transmission gear train 60. Although the torque limiter 110 is disposed in a part of the third transmission gear train 80, the torque limiter 110 is drivenly rotated, because a rotary torque greater than or equal to a limit torque is not applied to the torque limiter 110. Therefore, in the third transmission gear train 80, a driving force is transmitted through the first to third gears 81 to 83 and the torque limiter 110 to the fourth and fifth gears 84 and 85.

Subsequently, a driving force is transmitted from the fifth gear 85 to the second transmission gear train 70 (first to third gears 71 to 73) and to the output roller 26. As a result, the output roller 26 rotates in the predetermined normal direction A at a predetermined rotation speed.

In the present exemplary embodiment, although the output roller 26 is rotated in the normal direction for a time longer than a time for which the output roller 26 is rotated in the reverse direction. However, because current is not applied to the electromagnetic clutch 100 during this time, it is possible to increase the lifetime of the electromagnetic clutch 100 and to suppress generation of heat due to energization of the electromagnetic clutch 100. When Electromagnetic Clutch is ON In order to rotate the output roller 26 in a direction (reverse direction) opposite to the (normal) direction in which the sheet S is output (when performing, for example, a duplex recording operation), the controller (not shown) causes current to the electromagnetic clutch 100 to be turned on.

Figure 10:
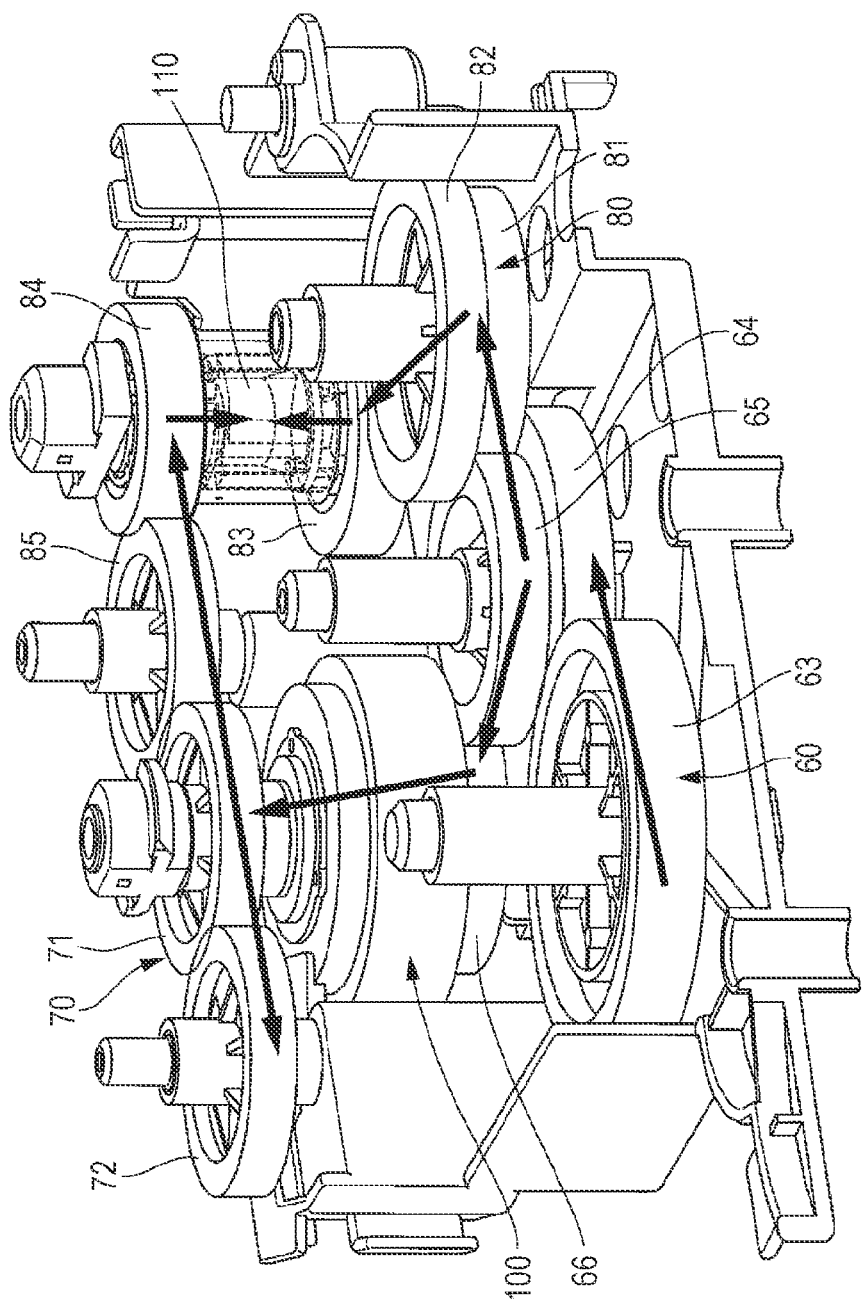
Figure 11B:
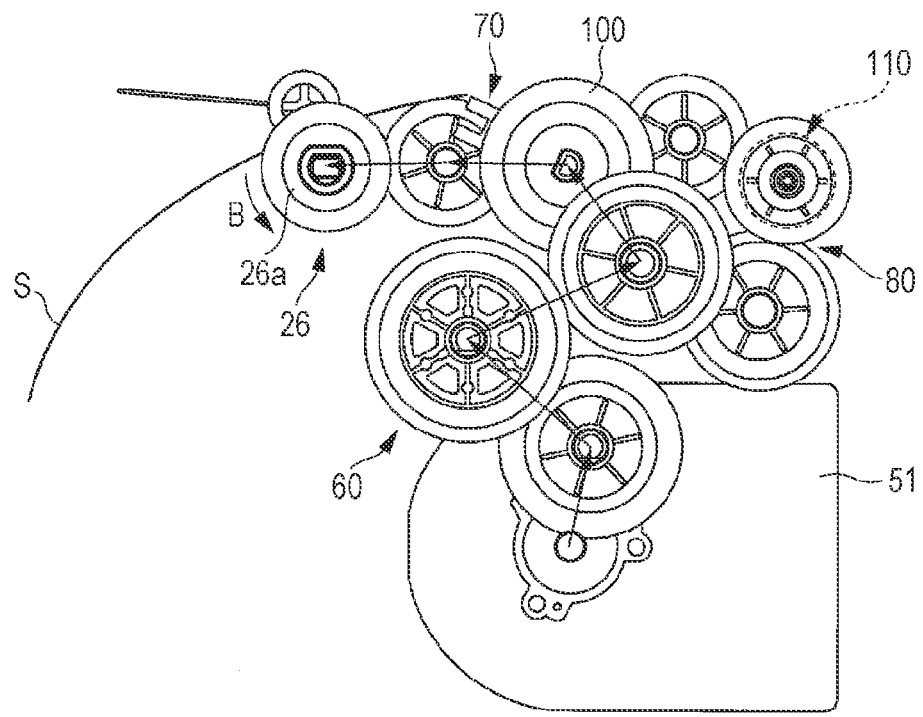
FIG. 11B is a schematic view illustrating a drive transmission path of the rotary driving device in FIG. 10.

In this state, as illustrated in FIGS. 10 and 11B, because current to the electromagnetic clutch 100 is turned on, a drive transmission path through the electromagnetic clutch 100 is connected. Thus, when a driving force from the sixth gear 66 of the first transmission gear train 60 acts on the electromagnetic clutch 100, the driving force is transmitted through the electromagnetic clutch 100 to the second transmission gear train 70.

Therefore, in the present exemplary embodiment, a driving force from the driving motor 51 is transmitted to the second transmission gear train 70 through the first to sixth gears 61 to 66 of the first transmission gear train 60 and the electromagnetic clutch 100. At this time, a driving force is transmitted to the third transmission gear train 80 from the fifth gear 65 of the first transmission gear train 60, and a driving force is transmitted to the third transmission gear train 80 from the first gear 71 of the second transmission gear train 70. Thus, the driving forces in opposite rotation directions are transmitted from both sides to the torque limiter 110, which is disposed in a part of the third transmission gear train 80. Therefore, a rotary torque that is greater than or equal to the limit torque is applied to the torque limiter 110, and therefore the torque limiter 110 stops being drivenly rotated and rotates freely. Therefore, in the third transmission gear train 80, a driving force is disconnected by the torque limiter 110.

Accordingly, in the present exemplary embodiment, the first transmission gear train 60 and the second transmission gear train 70 become directly connected to each other through the electromagnetic clutch 100. Therefore, a driving force from the driving motor 51 is transmitted along these drive transmission paths to the output roller 26. As a result, the output roller 26 rotates in the reverse direction B, which is opposite to the predetermined normal direction, at a predetermined rotation speed.

First Comparative Example

Next, in order to evaluate the performance of the rotary driving device according to the present exemplary embodiment, a rotary driving device according to a first comparative example will be described with reference to FIGS. 12 and 13.

Figure 12:
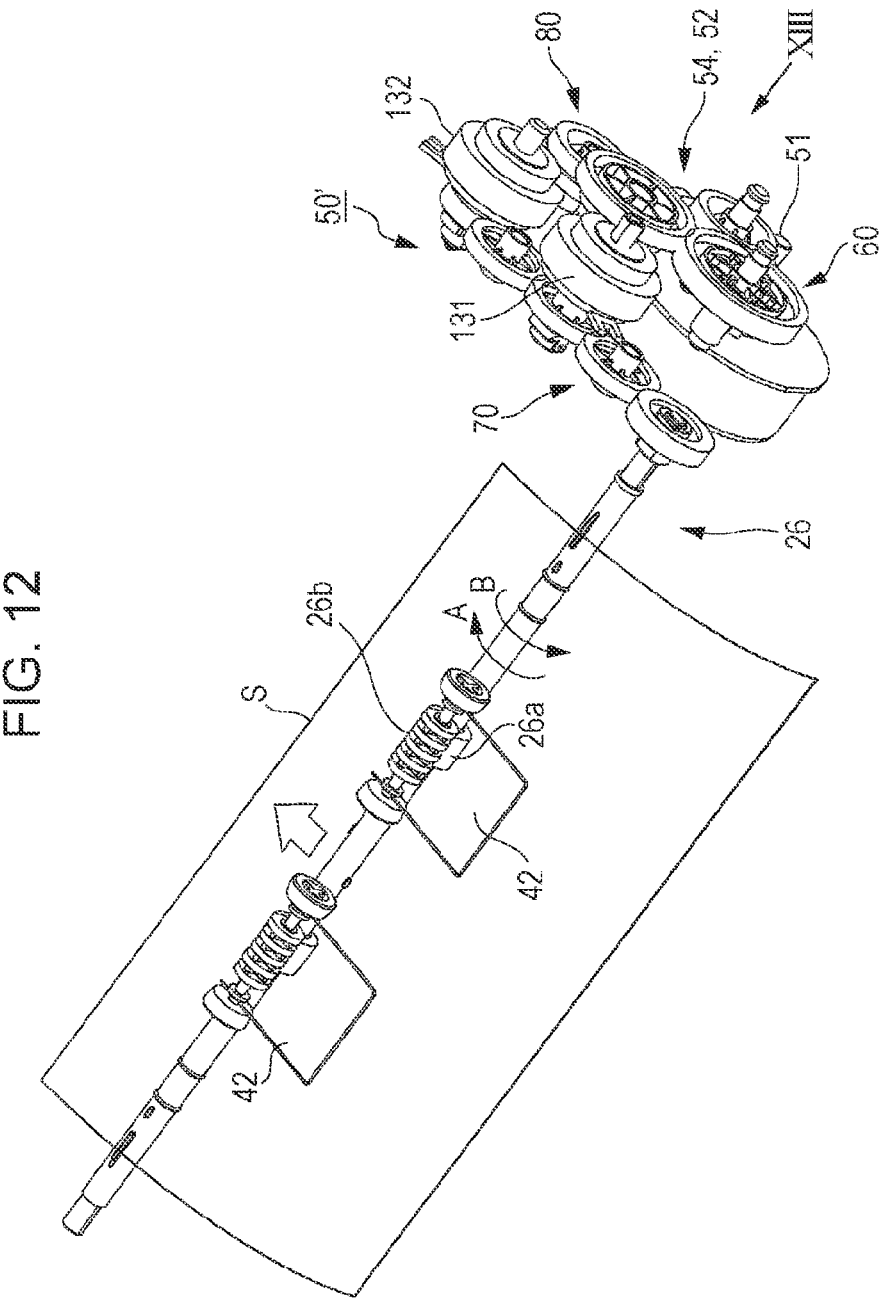
FIG. 12 illustrates a rotary driving device for an output roller according to a first comparative example.
Figure 13:
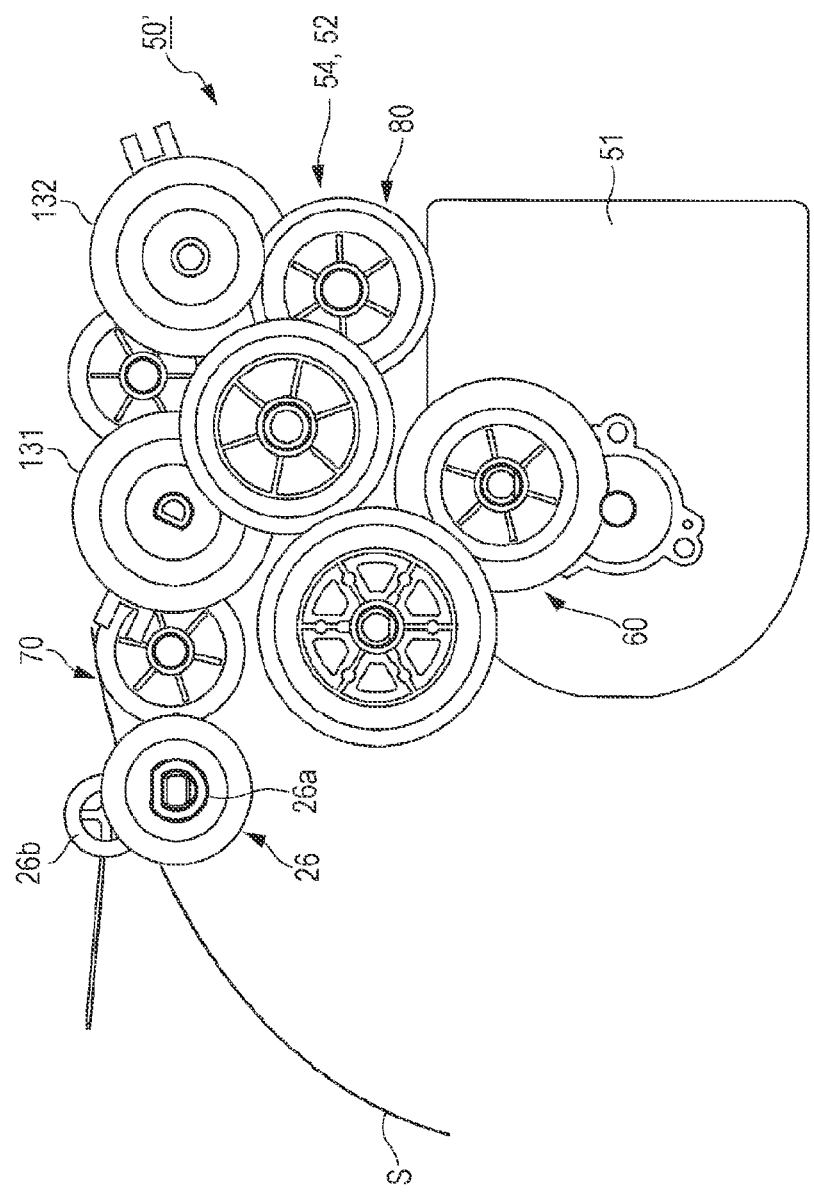
FIG. 13 illustrates the rotary driving device of FIG. 12 seen in the direction of arrow XIII in FIG. 12.

Referring to FIGS. 12 and 13, as with the first exemplary embodiment, a rotary driving device 50' according to the first comparative example includes a driving motor 51 and a drive switching mechanism 52 including a drive transmission system for a fixing operation (not shown) and a drive transmission system 54 for an output operation.

The drive transmission system (not shown) for a fixing operation according to the first comparative example is the same as that of the first exemplary embodiment. Moreover, as in the first exemplary embodiment, the drive transmission system 54 for an output operation includes a first transmission gear train 60 (first to sixth gears 61 to 66), a second transmission gear train 70 (first to third gears 71 to 73), and a third transmission gear train 80 (first to fifth gears 81 to 85). However, the first comparative example differs from the first exemplary embodiment in that a first electromagnetic clutch 131 is disposed between the first and second transmission gear trains 60 and 70 and a second electromagnetic clutch 132 is disposed at a position in a part of the third transmission gear train 80, which is, for example, a position between the third and fourth gears 83 and 84.

First Electromagnetic Clutch OFF, Second Electromagnetic Clutch ON

In order to rotate the output roller 26 in a direction (normal direction) in which the sheet S is output, a controller (not shown) causes current to the first electromagnetic clutch 131 to be turned off and causes current to the second electromagnetic clutch 132 to be turned on.

Figure 14:
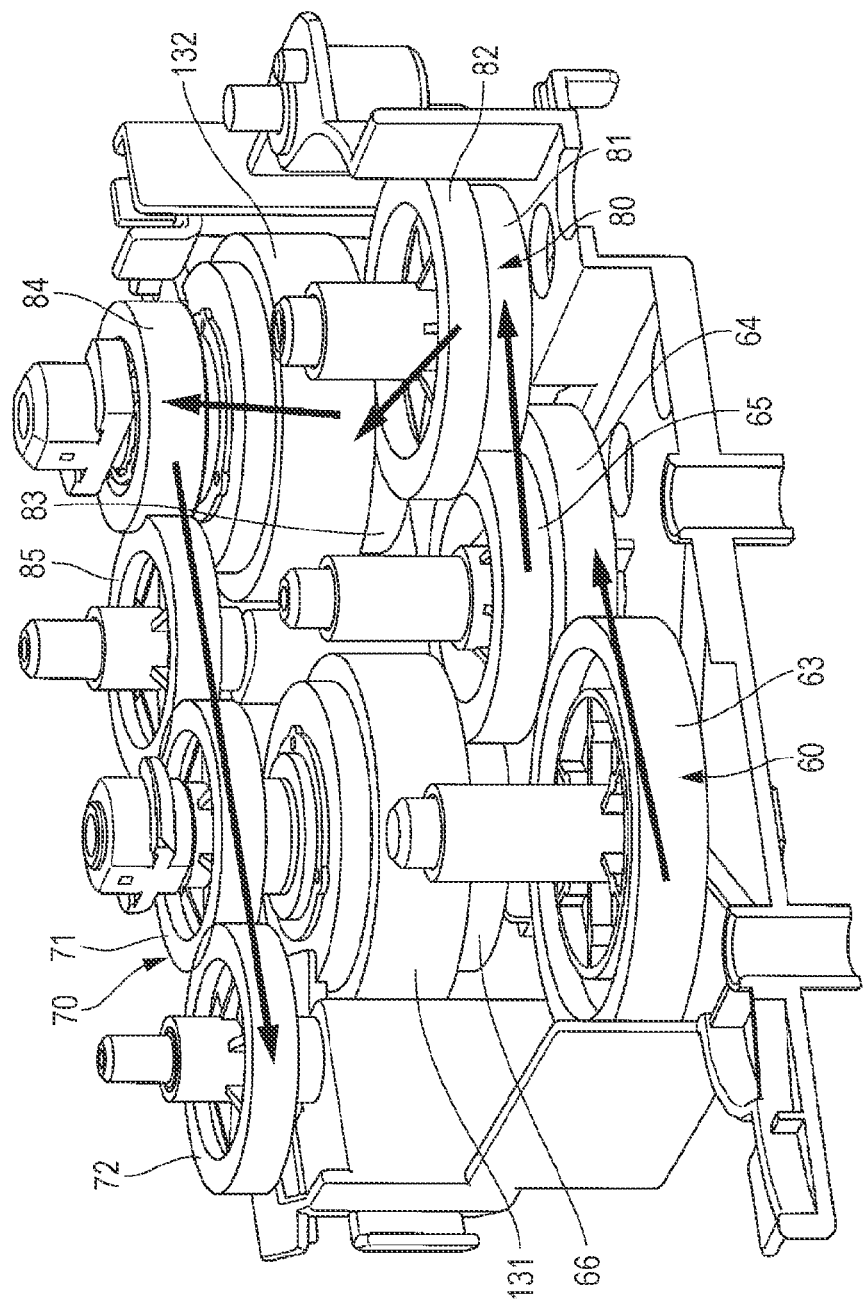
Figure 16A:
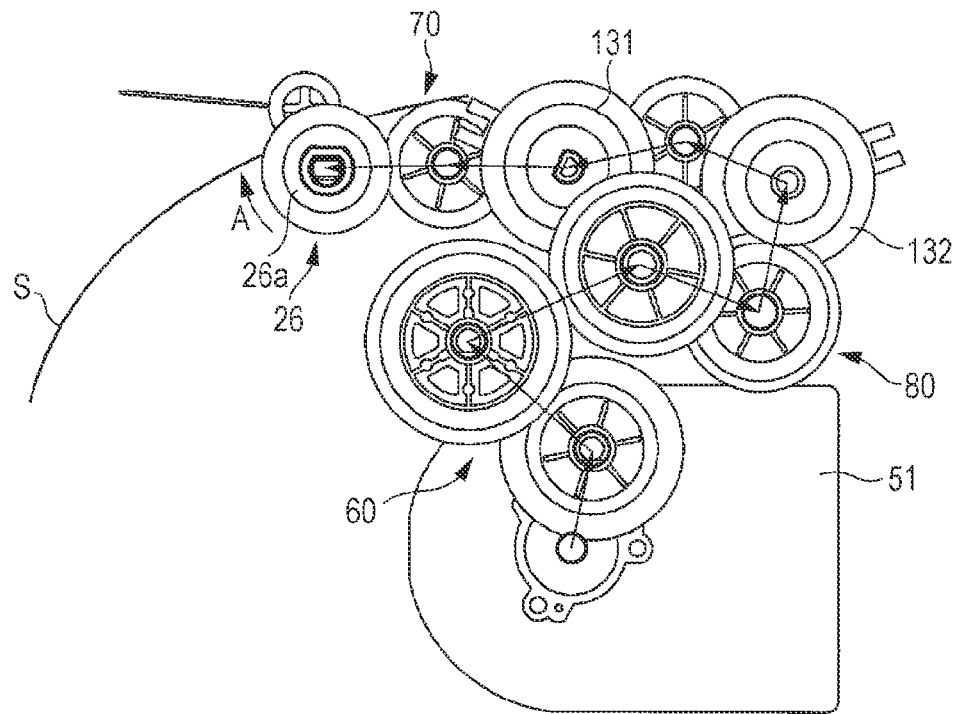
FIG. 16A is a schematic view illustrating a drive transmission path of the rotary driving device according to the first comparative example in FIG. 14.

In this state, as illustrated in FIGS. 14 and 16A, because current to the first electromagnetic clutch 131 is turned off, a drive transmission path through the first electromagnetic clutch 131 is disconnected. On the other hand, because current to the second electromagnetic clutch 132 is turned on, a drive transmission path through the second electromagnetic clutch 132 is connected.

Therefore, in the present comparative example, a driving force from the driving motor 51 is transmitted from the first transmission gear train 60 along an indirect path through the third transmission gear train 80 and then transmitted through the second transmission gear train 70 to the output roller 26. As a result, the output roller 26 rotates in a predetermined normal direction A at a predetermined rotation speed.

First Electromagnetic Clutch ON, Second Electromagnetic Clutch OFF

Next, in order to rotate the output roller 26 in a direction (reverse direction) opposite to the (normal) direction in which the sheet S is output (when performing, for example, a duplex recording operation), the controller (not shown) causes current to the first electromagnetic clutch 131 to be turned on and causes current to the second electromagnetic clutch 132 to be turned off.

Figure 15:
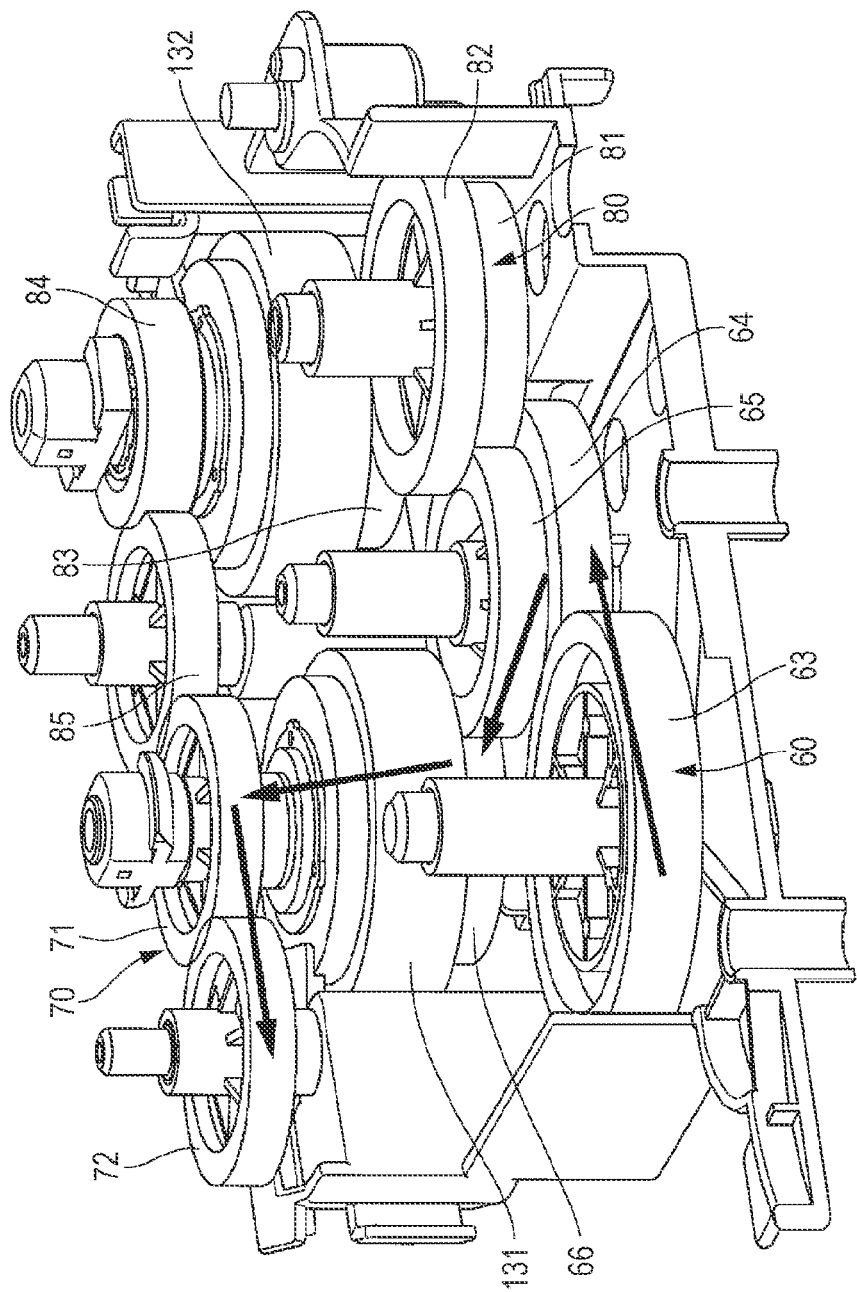
FIG. 15 illustrates the rotary driving device according to the first comparative example in an operating state in which a first electromagnetic clutch is ON and a second magnetic clutch is OFF.
Figure 16B:
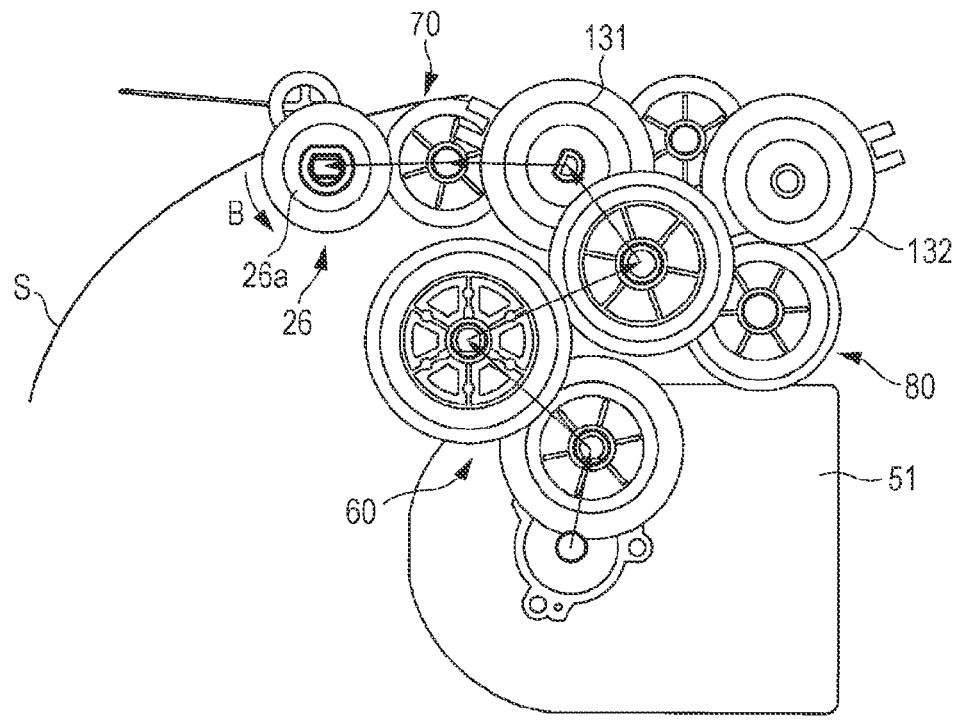
FIG. 16B is a schematic view illustrating a drive transmission path of the rotary driving device in FIG. 15.

In this state, as illustrated in FIGS. 15 and 16B, because current to the first electromagnetic clutch 131 is turned on, a drive transmission path through the first electromagnetic clutch 131 is connected. On the other hand, because current to the second electromagnetic clutch 132 is turned off, a drive transmission path through the second electromagnetic clutch 132 is disconnected.

Therefore, in the first comparative example, a driving force from the driving motor 51 is directly transmitted from the first transmission gear train 60 through the first electromagnetic clutch 131 to the second transmission gear train 70 and to the output roller 26. As a result, the output roller 26 rotates in the reverse direction B, which is opposite to the predetermined normal direction, at a predetermined rotation speed.

As described above, with the rotary driving device 50' according to the first comparative example, because one of the first electromagnetic clutch 131 and the second electromagnetic clutch 132 is turned on, the number of components of the electromagnetic clutches 131 and 132 may increase and a large amount of heat may be generated from the electromagnetic clutches 131 and 132.

Second Exemplary Embodiment

Figure 17:
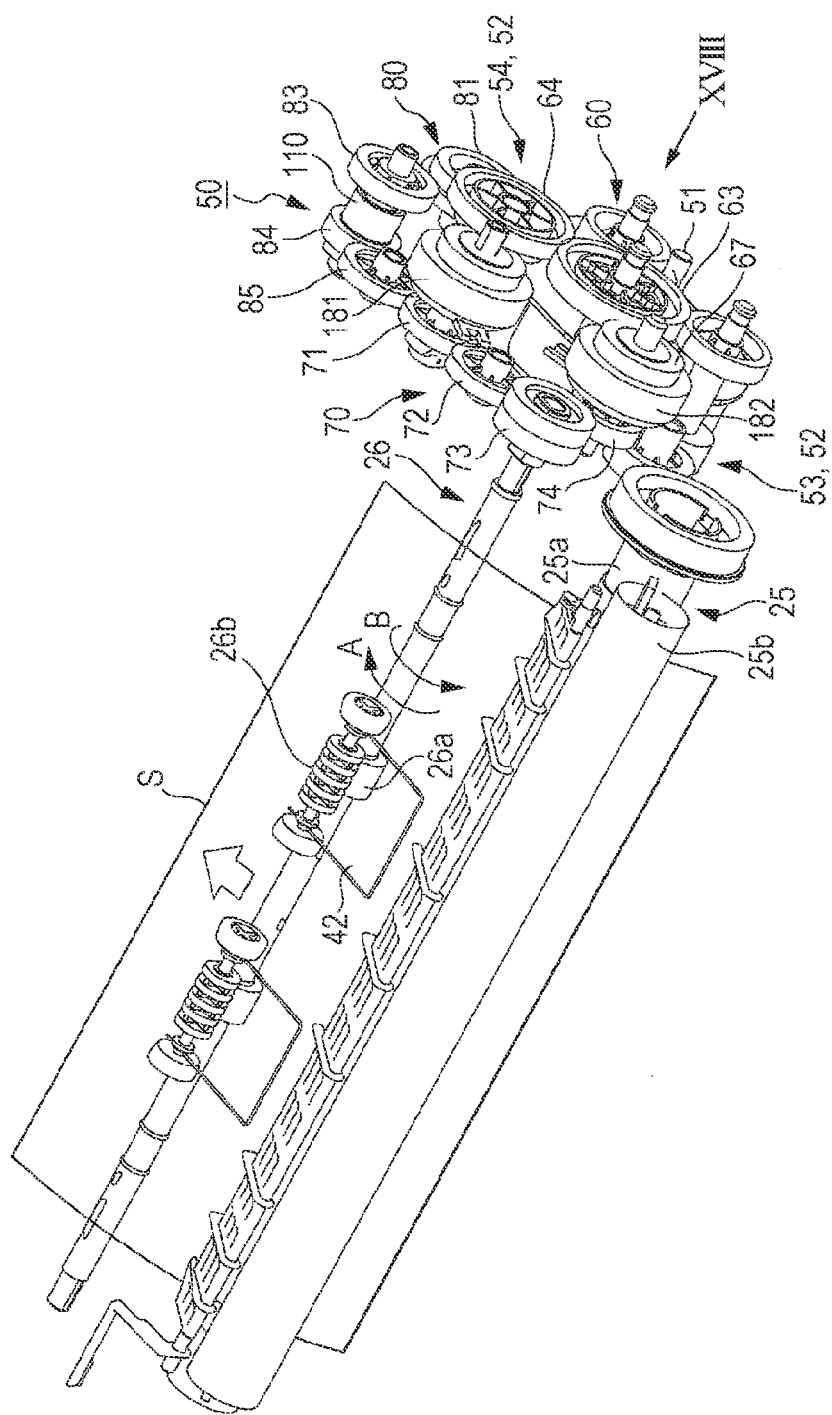
FIG. 17 illustrates a rotary driving device for driving an output roller and a fixing device according to a second exemplary embodiment.
Figure 18:
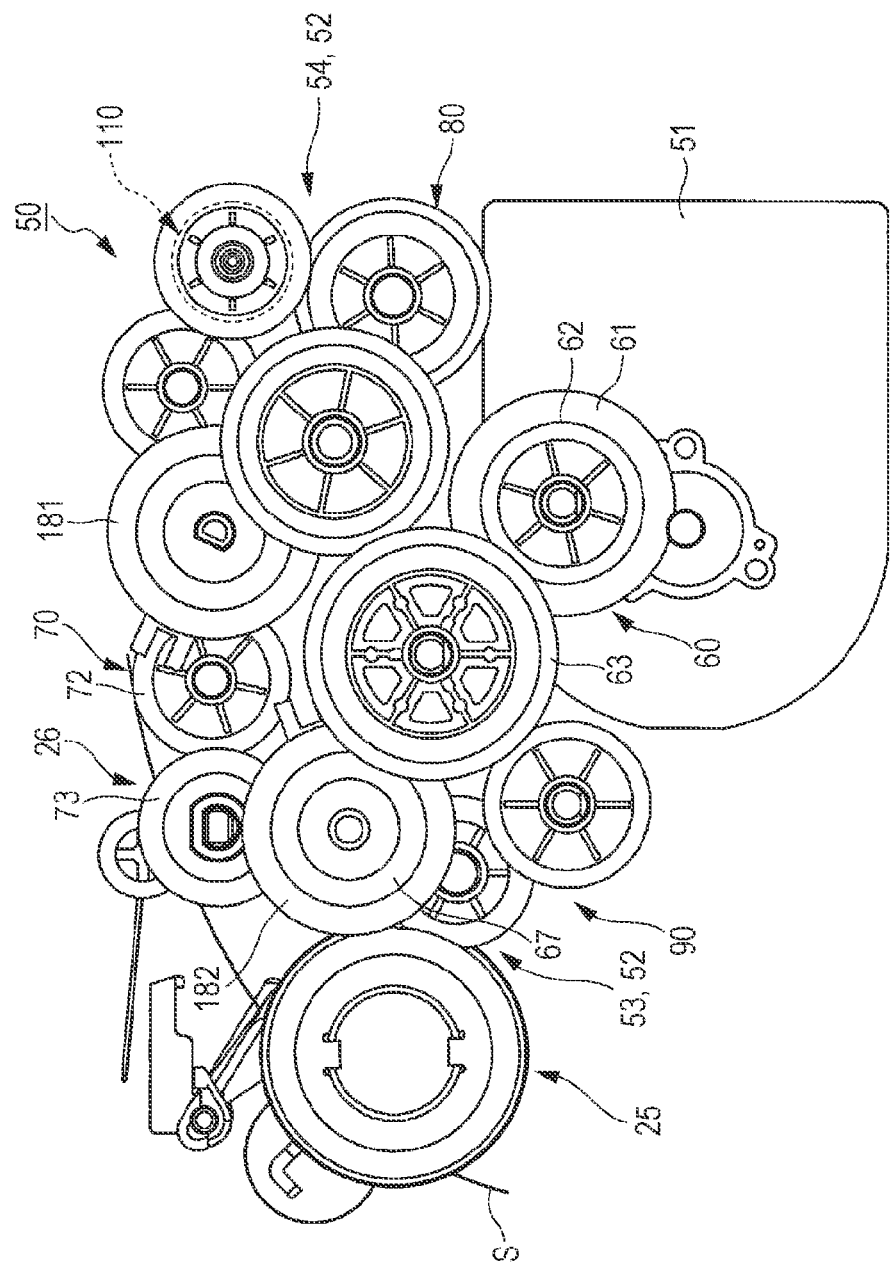
FIG. 18 illustrates the rotary driving device of FIG. 17 seen in the direction of arrow XVIII in FIG. 17.

FIGS. 17 and 18 illustrate a rotary driving device according to a second exemplary embodiment.

Referring to FIGS. 17 and 18, as in the first exemplary embodiment, the rotary driving device 50 includes a driving motor 51 and a drive switching mechanism 52 including a drive transmission system 53 for a fixing operation and a drive transmission system 54 for an output operation.

In the present exemplary embodiment, the drive transmission system 53 for a fixing operation is the same as that of the first exemplary embodiment, but the drive transmission system 54 for an output operation differs from that of the first exemplary embodiment.

To be specific, as in the first exemplary embodiment, the drive transmission system 54 for an output operation includes a first transmission gear train 60 (in the present exemplary embodiment, gears 61 to 66) for transmitting a driving force from the driving motor 51, a third transmission gear train 80 (gears 81 to 85), and a torque limiter 110 disposed in a part of the third transmission gear train 80. However, the second exemplary embodiment differs from the first exemplary embodiment in the structure of the second transmission gear train 70 and in that plural electromagnetic clutches 181 and 182 are used.

The electromagnetic clutch 181 is used for a normal-speed mode in which the output roller 26 is rotated in the reverse direction at a normal speed. The electromagnetic clutch 182 is used for a high-speed mode in which the output roller 26 is rotated in the reverse direction at a high speed, which is higher than the normal speed.

In the present exemplary embodiment, the second transmission gear train 70 includes a normal-speed system and a high-speed system. The normal-speed system is a gear train that causes the rotation speed of the output roller 26 in the reverse direction to be a normal speed. The normal-speed system includes a first gear 71, a second gear 72, and a third gear 73. The first gear 71 is coaxially connected through an electromagnetic clutch 181 for normal speed to the sixth gear 66 of the first transmission gear train 60. The second gear 72 meshes with the peripheral surface of the first gear 71. The output gear 73 meshes with the peripheral surface of the second gear 72 and is coaxial with the drive output roller 26a. The high-speed system is a gear train that causes the rotation speed of the output roller 26 in the reverse direction rotation to be a high speed. The high-speed system includes the output gear 73, and a pre-output gear 74 that meshes with the peripheral surface of the output gear 73. The first transmission gear train 60 further includes a seventh gear 67 that meshes with the peripheral surface of the third gear 63. The seventh gear 67 is disposed so as to be coaxial with the pre-output gear 74, and the electromagnetic clutch 182 is disposed between the gears 67 and 74.

Next, an operation of the rotary driving device according to the second exemplary embodiment will be described.

Electromagnetic Clutch for Normal Speed OFF, Electromagnetic Clutch for High Speed OFF In order to rotate the output roller 26 in a direction (normal direction) in which the sheet S is output, a controller (not shown) applies currents to the electromagnetic clutches 181 and 182.

Figures 19A, 19B:
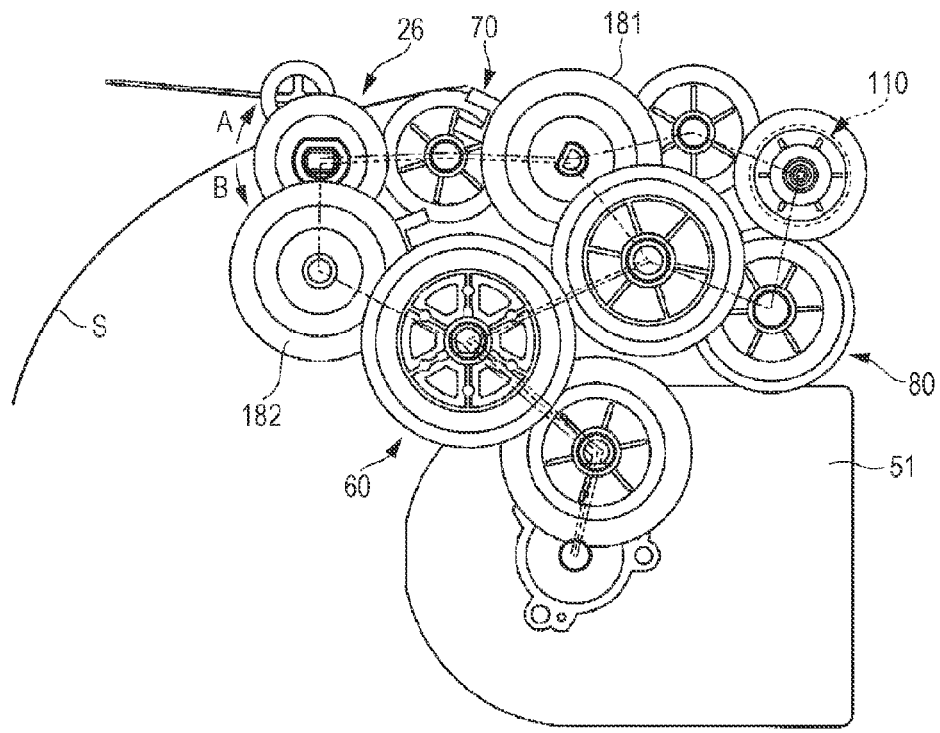
FIG. 19A is a schematic view illustrating drive transmission paths of a rotary driving device according to a third exemplary embodiment.
FIG. 19B is a table showing operating states of an electromagnetic clutch for normal speed, an electromagnetic clutch for high speed, and a torque limiter for each of the drive transmission paths.

In this state, as shown in FIGS. 19A and 19B, because currents to the electromagnetic clutches 181 and 182 are turned off, drive transmission paths through the electromagnetic clutches 181 and 182 are disconnected. Thus, even if a driving force from the first transmission gear train 60 is applied to the electromagnetic clutches 181 and 182, the driving force is not transmitted through the electromagnetic clutches 181 and 182, because the electromagnetic clutches 181 and 182 are in freely rotatable states.

Therefore, in the present exemplary embodiment, as shown by an alternate long and short dash line in FIG. 19A, a driving force from the driving motor 51 is transmitted to the third transmission gear train 80 through first to sixth gears 61 to 65 of the first transmission gear train 60. As in the first exemplary embodiment, the torque limiter 110 is disposed in the third transmission gear train 80, and the torque limiter 110 is drivenly rotated. Therefore, a driving force is transmitted in the third transmission gear train 80 through the first to third gears 81 to 83 and the torque limiter 110, and to the fourth and fifth gears 84 and 85.

Subsequently, a driving force is transmitted from the fifth gear 85 to the second transmission gear train 70 (first to third gears 71 to 73) and to the output roller 26. As a result, the output roller 26 rotates in a predetermined normal direction A at a predetermined rotation speed.

Electromagnetic Clutch for Normal Speed OFF, Electromagnetic Clutch for High Speed ON Next, in order to rotate the output roller 26 at a high speed in a direction (reverse direction) opposite to the (normal) direction in which the sheet S is output (when performing, for example, a duplex recording operation), a controller (not shown) causes current to the electromagnetic clutch 181 for normal speed to be turned off and causes current to the electromagnetic clutch 182 for high speed to be turned on.

In this state, as shown in FIGS. 19A and 19B, because current to the electromagnetic clutch 181 for normal speed is turned off, a drive transmission path through the electromagnetic clutch 181 is disconnected. On the other hand, because current to the electromagnetic clutch 182 for high speed is turned on, a drive transmission path through the electromagnetic clutch 182 is connected.

Therefore, in the present exemplary embodiment, as shown by a two-dot chain line in FIG. 19A, a driving force from the driving motor 51 is directly transmitted to the second transmission gear train 70 (gears 74 and 73) through the first transmission gear train 60 and the electromagnetic clutch 182 for high speed to the output roller 26, and the output roller 26 rotates in the reverse direction B opposite the predetermined normal direction A.

Accordingly, for example, in a duplex record mode, the electromagnetic clutch 182 for high speed functions to rapidly return a sheet S back to the return transport path 40.

Electromagnetic Clutch for Normal Speed ON, Electromagnetic Clutch for High Speed OFF In order to rotate the output roller 26 at a normal speed in a direction (reverse direction) opposite to the (normal) direction in which the sheet S is output, a controller (not shown) causes current to the electromagnetic clutch 181 for normal speed to be turned on and causes current to the electromagnetic clutch 182 for high speed to be turned off.

In this state, as shown in FIGS. 19A and 19B, because current to the electromagnetic clutch 181 for normal speed is turned on, the drive transmission path through the electromagnetic clutch 181 for normal speed is connected. On the other hand, because current to the electromagnetic clutch 182 for high speed is turned off, the drive transmission path through the electromagnetic clutch 182 for high speed is disconnected.

Therefore, in the present exemplary embodiment, as shown by a dotted line in FIG. 19A, a driving force from the driving motor 51 is directly transmitted from the first transmission gear train 60 to the second transmission gear train 70 (gears 71 and 73) through the electromagnetic clutch 181 for normal speed to the second transmission gear train 70 and to the output roller 26, and the output roller 26 rotates in the reverse direction B opposite the predetermined normal direction A.

The output roller 26 may be rotated in the reverse direction at a normal speed when, for example, a sheet has been returned at a high speed in the reverse direction in a duplex record operation. In this case, when the image-forming engine 21 forms an image on the other surface (a second surface of the sheet S), it is necessary to make the rotation speed of the output roller 26 to be the normal speed before the image is started to be formed on the second surface.

When the output roller 26 is rotated at a high speed and the trailing end of the first surface of the sheet S passes the output roller 26, the leading end of the second surface of the sheet S approaches the output roller 26. Therefore, in the present exemplary embodiment, currents to the electromagnetic clutches 181 and 182 are turned off, so that the rotation direction of the output roller 26 is changed due to the function of the torque limiter 110.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A drive switching mechanism comprising:
  a first transmission element train that transmits a driving force from a drive source that rotates in a predetermined direction;
  a second transmission element train that is connectable to the first transmission element train and that transmits the driving force to a rotatable body;
  a third transmission element train disposed in an indirect path connecting an element of the first transmission element train to an element of the second transmission element train;
  a connection/disconnection element disposed at one of a position between the first and second transmission element trains and a position in the third transmission element train, the connection/disconnection element connecting or disconnecting a drive transmission path depending on whether or not current is applied thereto; and
  a rotation restraining element disposed at the other of the position between the first and second transmission element trains and the position in the third transmission element train, the rotation restraining element being drivenly rotated, when the drive transmission path is disconnected by the connection/disconnection element, on the basis of a driving force transmitted from the first transmission element train and selecting a drive transmission path that is different from the drive transmission path disconnected by the connection/disconnection element, and the rotation restraining element stopping being drivenly rotated, when the drive transmission path is connected by the connection/disconnection element, on the basis of driving forces transmitted from the first and second transmission element trains and selecting the drive transmission path connected by the connection/disconnection element.

2. The drive switching mechanism according to claim 1, wherein the rotation restraining element is a torque limiter that is drivenly rotated when a torque smaller than a predetermined limit torque is applied thereto and that stops being drivenly rotated and rotates freely when a torque larger than or equal to the predetermined limit torque is applied thereto.

3. The drive switching mechanism according to claim 1, wherein, when the first and second transmission element trains are directly connected to each other, the first to third transmission element trains rotate the rotatable body in a predetermined normal direction, and, when the first to third transmission element trains are connected to each other along the indirect path, the first to third transmission element trains rotate the rotatable body in a reverse direction that is opposite to the normal direction.

4. The drive switching mechanism according to claim 2, wherein, when the first and second transmission element trains are directly connected to each other, the first to third transmission element trains rotate the rotatable body in a predetermined normal direction, and, when the first to third transmission element trains are connected to each other along the indirect path, the first to third transmission element trains rotate the rotatable body in a reverse direction that is opposite to the normal direction.

5. A rotary driving device comprising:
  a drive source that rotates in a predetermined direction; and
  a drive switching mechanism that transmits a driving force from the drive source to a rotatable body so that a rotational state of the rotatable body is switchable, the drive switching mechanism including
    a first transmission element train that transmits a driving force from a drive source that rotates in a predetermined direction,
    a second transmission element train that is connectable to the first transmission element train and that transmits the driving force to a rotatable body,
    a third transmission element train disposed in an indirect path connecting an element of the first transmission element train to an element of the second transmission element train,
    a connection/disconnection element disposed at one of a position between the first and second transmission element trains and a position in the third transmission element train, the connection/disconnection element connecting or disconnecting a drive transmission path depending on whether or not current is applied thereto, and a rotation restraining element disposed at the other of the position between the first and second transmission element trains and the position in the third transmission element train, the rotation restraining element being drivenly rotated, when the drive transmission path is disconnected by the connection/disconnection element, on the basis of a driving force transmitted from the first transmission element train and selecting a drive transmission path that is different from the drive transmission path disconnected by the connection/disconnection element, and the rotation restraining element stopping being drivenly rotated, when the drive transmission path is connected by the connection/disconnection element, on the basis of driving forces transmitted from the first and second transmission element trains and selecting the drive transmission path connected by the connection/disconnection element.

6. The rotary driving device according to claim 5, wherein current is applied to the connection/disconnection element when the rotational body is in a rotational state in which a rotating time of the rotational body is short.

7. A drive processing device comprising:
a rotatable body that is driven so that a rotational state thereof is switchable; and
a rotary driving device that rotates the rotatable body, wherein the rotary driving device according to claim 5 is used as the rotary driving device.

8. The drive processing device according to claim 7, further comprising:
an image forming unit that forms an image on a recording medium;
a recording medium transport unit that transports the recording medium to the image forming unit; and
a recording medium container that contains the recording medium on which the image has been formed,
wherein the recording medium transport unit uses the rotary driving device when driving a transport member that switches a transport state of the recording medium.

* * * * *